US006656977B2

(12) United States Patent
Slone et al.

(10) Patent No.: US 6,656,977 B2
(45) Date of Patent: Dec. 2, 2003

(54) ALKYL GLYCIDYL ETHER-CAPPED POLYAMINE FOAM CONTROL AGENTS

(75) Inventors: Caroline Sassano Slone, Quakertown, PA (US); Kevin Rodney Lassila, Macungie, PA (US)

(73) Assignee: Air Products and Chemical, Inc., Allentown, PA (US)

( * ) Notice: Subject to any disclaimer, the term of this patent is extended or adjusted under 35 U.S.C. 154(b) by 0 days.

(21) Appl. No.: 09/909,555

(22) Filed: Jul. 20, 2001

(65) Prior Publication Data

US 2003/0087969 A1 May 8, 2003

(51) Int. Cl.[7] .............................................. B01D 19/04
(52) U.S. Cl. ...................... 516/129; 208/206; 208/207; 504/358; 510/499; 162/158; 8/551; 524/244; 524/245
(58) Field of Search .......................... 516/129; 208/203, 208/204, 206, 207; 435/812; 504/358, 362; 510/433, 499, 427; 134/22.19; 507/246; 8/551, 604; 524/244, 245; 162/158

(56) References Cited

U.S. PATENT DOCUMENTS

| 3,467,684 A | * | 9/1969 | Lane ............................ 423/24 |
| 3,931,430 A | | 1/1976 | Tada et al. ................... 428/195 |
| 4,145,307 A | * | 3/1979 | Krapf et al. ................... 516/27 |
| 4,311,618 A | | 1/1982 | Schafer-Burkhard ........ 252/542 |
| 4,650,000 A | | 3/1987 | Andreasson et al. ........ 166/307 |
| 4,797,202 A | | 1/1989 | Klimpel et al. .............. 209/166 |
| 5,350,784 A | * | 9/1994 | Darwen et al. .............. 523/404 |

FOREIGN PATENT DOCUMENTS

| CH | 313159 | 5/1956 |
| JP | 450119973 | 7/1970 |
| JP | 52010847 | 3/1977 |
| JP | 2001107083 | 4/2001 |

OTHER PUBLICATIONS

Japan Patent Office, Machine Translation of JP 2001–107083, http://www6.ipdl.jpo.go.jp/Tokujitu/PAJdetail.ipdl?N0000=60&N0120=01&N2001=2&N3001=2001–107083, copyright 1998, 2000 (May 2002).*
U.S. Application No. 10/061,898, Filed On Feb. 01, 2002, Inventors C.S. Slone And K.R. Lassila.

* cited by examiner

Primary Examiner—Daniel S. Metzmaier
(74) Attorney, Agent, or Firm—Michael Leach

(57) ABSTRACT

A method for controlling the foaming of an aqueous organic compound-containing composition by the incorporation of a foam controlling amount of a compound of the formula:

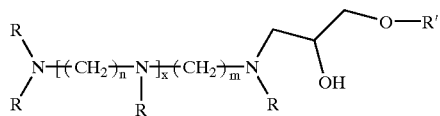

where n and m are 2 or 3,
 x is 1–6,

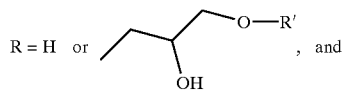

R' is a C4 to C22 alkyl group,
where R' is a C4 to C22 alkyl group, the compound generating an initial foam height at least 30% less than a 0.1 wt % aqueous solution of dioctyl sodium sulfosuccinate (DOSS) when added at 0.1 wt % to the DOSS solution.

11 Claims, No Drawings

ALKYL GLYCIDYL ETHER-CAPPED POLYAMINE FOAM CONTROL AGENTS

FIELD OF THE INVENTION

The invention relates to the use of the reaction products of polyamines and alkyl glycidyl ethers as foam control agents.

BACKGROUND OF THE INVENTION

Foam control or elimination in many waterborne applications and industrial processes is critical for obtaining optimal performance in application and high process efficiency. The importance of foam control and elimination in applications such as waterborne coatings, inks, adhesives, and agricultural formulations and in industrial processes such as oil well pumping, petroleum gas scrubbing, cleansing and disinfecting, food processing, pulp and paper processing, fermentation, metal treatment, polymer and chemical synthesis, waste-water treatment and textile dying and finishing is well-appreciated in the art.

Foam control agents are widely used in polymer production and processing, as foam can lead to reduced production capacity, efficiency and equipment problems. In particular, severe foaming problems commonly result upon stripping unreacted monomers from the polymer product.

Undesirable foam can lead to inefficient mixing, poor productivity, reduced vessel capacity and equipment failure in many common industrial processes. For instance, foaming in refinery processes such as drilling, production, stimulation, distillation, extraction, gas and liquid scrubbing and other operations leads to a number of operating difficulties and significant economic consequences. In acid gas sweetening, gases such as carbon dioxide and hydrogen sulfide are removed via scrubbing with an aqueous amine solution. Problematic foam can occur during both the scrubbing or regeneration steps in this process.

Defoamers and antifoams are additives that are used to reduce or eliminate problematic foam. An "antifoam" refers to a long-acting agent which prevents foam formation. A "defoamer" is a material that yields rapid knock-down of existing foam. Herein, the term "foam control agent" is used to refer to additives that eliminate and/or control foam since many applications and processes require both foam prevention and reduction or elimination.

In many applications it is desired that foam control agents exhibit positive ancillary surface properties, such as wetting, dispersion, emulsification, solubilization, flow and leveling. For example, defoamers and antifoams that act as wetting agents will greatly reduce surface defects in coatings, inks, adhesives and agricultural formulations. In addition, such multi-functional materials will allow for the reduction or elimination of wetting agents in a waterborne composition, thereby reducing the total amount of additives. The ability of a material to act as a wetting agent in waterborne formulations is assessed by its ability to reduce the surface tension of water. Equilibrium surface tension performance is important when a system is at rest. However, the ability to reduce surface tension under dynamic conditions is of great importance in applications where high surface creation rates are utilized. Such applications include the spraying, rolling and brushing of coatings, adhesives or agricultural formulations, or high-speed gravure or ink-jet printing. Dynamic surface tension is a fundamental quantity which provides a measure of the ability of a substance to reduce surface tension and provide wetting under high-speed application conditions. Also, it is under such high speed application conditions where the entrainment of air and the creation of foam is a problem.

Adducts prepared by the reaction of polyamines with alkyl glycidyl ethers (epoxies) may be found in the literature. Such amines have been utilized in a variety of applications. Depending upon the polyamine, five or more epoxy reagents may be used to form a completely adducted amine. The majority of examples in the literature contain amines which are not fully adducted.

U.S. Pat. No. 4,650,000 discloses adducts prepared by the reaction of polyamines with C6–C18 alkyl glycidyl ethers have been shown to be effective surfactants for the formation of microemulsions containing a hydrocarbon oil and aqueous acid solutions used to treat subterranean rock formations surrounding oil and gas wells. In this case, the amine surfactants were all utilized in the microemulsions as cationic quaternary ammonium salts.

U.S. Pat. No. 4,797,202 discloses N-(hydrocarbyl)-α,ω-alkanediamines as collectors for the recovery of minerals from mineral ores by froth flotation. In particular, the 1:1 adduct of diethylenetriamine and 2-ethylhexyl glycidyl ether was shown to be effective for copper recovery in the froth flotation of copper sulfide.

CH 313 159 discloses a process for the preparation of stable dye and stripper baths containing positively charged amine additives. The baths contain 1:1 adducts of diamines and polyamines and C8 and greater alkylglycidyl ethers and the corresponding alkylated amines formed by subsequent reactions with ethylene oxide, dimethyl sulfate, chloroacetic acid and other reagents.

U.S. Pat. No. 4,311,618 discloses the use of a water soluble cleanser concentrate comprising an ionic surfactant, a non-ionic surfactant, an amphoteric dissociating agent and an organic aprotic solvent. The hydrochloride salt of the 1:2 adduct of diethylenetriamine and 2-ethylhexyl glycidyl ether is shown in Example 5.

JP52018047 discloses adducts prepared by the reaction of polyamines and up to 3 C6–C16 alkyl glycidyl ethers have been utilized as bactericides.

JP 450119973 discloses similar compounds which also contain carboxylate groups have been shown to be effective bactericidal surfactants.

U.S. Pat. No. 3,931,430 discloses the use of reaction products of diamines and polyamines and C4–C16 glycidyl esters and ethers as desensitizers for pressure-sensitive recording sheets. These desensitizers must be soluble in an oil vehicle used to make non-aqueous ink for offset printing.

SUMMARY OF THE INVENTION

The present invention relates to the use of the reaction products of polyamines and alkyl glycidyl ethers of the formula:

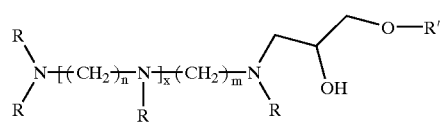

where
  n and m are 2 or 3,
  x is 1–6,

R = H or 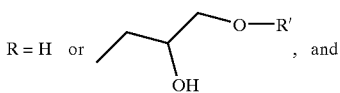, and

R' is a C4 to C22 alkyl group,
for controlling, i.e., reducing, preventing or eliminating, foam in waterborne compositions and industrial processes that otherwise manifest foaming. According to this invention, the foam control agent may be prepared from any C4 to C22 alkyl glycidyl ether and polyamine consistent with the above formula. These foam control agents are low color, low odor, 100% active materials.

Not all alkyl glycidyl ether-capped polyamines are capable of reducing or eliminating foam and certain adducts in fact add problematic foam to waterborne systems. Therefore, the correct combination of polyamine and alkyl glycidyl ether group and an optimum degree of adduction is essential for the reduction and/or elimination of foam. Thus, suitable alkyl glycidyl ether-capped polyamines are those that generate an initial foam height at least 30% less than a 0.1 wt % aqueous solution of dioctyl sodium sulfosuccinate (DOSS) when added at 0.1 wt % to the aqueous DOSS solution, as measured according to ASTM D 1173-53 at ambient temperature.

By "water-based", "waterborne", "aqueous" or "aqueous medium", we mean, for purposes of this invention, a solvent or liquid dispersing medium which comprises water, preferably at least 90 wt %, and most preferably at least 95 wt %, water. Obviously, an all water medium is also included.

As another embodiment of the invention, the foam control agents may be utilized as wetting agents.

There are significant advantages associated with the use of these alkyl glycidyl ether-capped polyamines as foam control agents in water-based compositions and processes and these advantages include one or more of the following:
  foam control agents which have low odor and color;
  foam control agents which comprise 100% active ingredient and thus do not require carrier fluids, solvents or other additives and exhibit improved shelf stability;
  waterborne coatings and inks which have low volatile organic content, thus making these formulations environmentally favorable;
  foam control agents capable of reducing the dynamic surface tension of waterborne compositions;
  waterborne coatings, inks, adhesives and agricultural formulations which may be applied to a variety of substrates with excellent wetting of substrate surfaces including contaminated and low energy surfaces;
  a reduction in coating or printing defects such as orange peel and flow/leveling deficiencies in comparison to conventional foam control agents;
  waterborne compositions capable of high speed application and processing; and
  industrial processes which have no foam or greatly reduced amounts of problematic foam with a reduction in negative down-stream effects.

DETAILED DESCRIPTION OF THE INVENTION

This invention relates to the use of the reaction products of certain polyamines and alkyl glycidyl ethers. Although it is widely recognized that such reaction products are mixtures, a major constituent of this mixture may be represented by the formula:

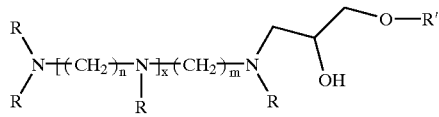

where
  n and m are 2 or 3,
  x is 1–6,

R = H or 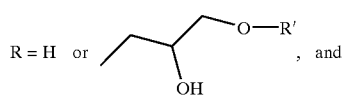, and

R' is a C4 to C22 alkyl group,
for the prevention or elimination of foam in waterborne formulations and industrial processes. Preferably and independently or jointly, R' is C4–C14 alkyl, x is 1 or 2, and n and m are 2. According to this invention, the foam control agent may be prepared from any C4 to C22 alkyl glycidyl ether and polyamine consistent with the above formula. It is readily apparent according to the formula that the compound may be adducted with from 1 to 5 alkyl glycidyl groups when x is 1 (degree of adduction=1 to 5) and with from 1 to 6 glycidyl groups when x is 2 (degree of adduction=1 to 6).

Suitable alkyl glycidyl ether-capped polyamines are those that generate an initial foam height at least 30% less than a 0.1 wt % aqueous solution of dioctyl sodium sulfosuccinate (DOSS) when added at 0.1 wt % to the aqueous DOSS solution, as determined according to ASTM D 1173-53 at ambient temperature, preferably an initial foam height at least 50% less.

It is also desirable that an aqueous solution of the foam control agent exhibits ancillary wetting properties, as demonstrated by a dynamic surface tension of less than or equal to ≦45 dynes/cm at a concentration of <1 wt % in water at 25° C. and 0.1 bubble/second according to the maximum-bubble pressure method. The maximum-bubble-pressure method of measuring surface tension is described in Langmuir 1986, 2, 428–432, which is incorporated by reference.

The excellent defoaming and antifoaming properties of these foam control agents suggest that these materials are likely to find applicability in applications and processes in which the reduction, prevention or knock-down of foam are important. Such applications include protective and decorative coatings, inks, adhesives, agricultural formulations, oil well pumping, petroleum gas scrubbing, cleansing and disinfecting, food processing, pulp and paper processing, fermentation, metal treatment, polymer and chemical synthesis, waste-water treatment and textile dyeing and finishing. In addition, these materials have the ability to also reduce dynamic surface tension of waterborne compositions. Such a combination of performance attributes allow these materials to be used to control and eliminate foam with significantly less deleterious effects in application, making them extremely useful in coatings, inks and adhesives. Moreover, the wetting ability of these foam control agents will allow these materials to be utilized in polymer production and processing without the appearance of negative defects in downstream applications.

These materials may be prepared by the reaction of a polyamine with one or more alkyl glycidyl ethers. The epoxide ring opening reaction may be performed using the amine either neat or in a solvent such as tetrahydrofuran. It is preferred that the alkyl glycidyl ether be added to the amine reagent and that the reaction temperature be maintained between 60 to 120° C. The product may be used as made or in a purified form. The reaction products obtained from polyamines and alkyl glycidyl ethers are mixtures, as the hydroxy group generated via the epoxide ring opening reaction may also react with an alkyl glycidyl ether. The reaction illustrated below in which 1 to 10 equivalents alkyl glycidyl ether are reacted with the polyamine shows one of the more common adducts contained in the product mixture:

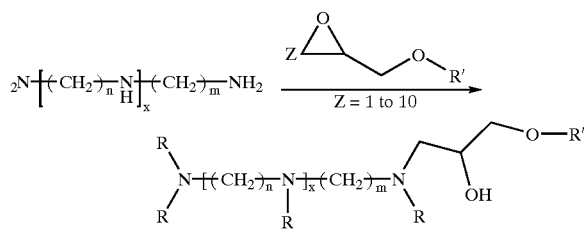

where R, R', m, n and x are as defined above.

All alkyl glycidyl ethers or mixtures of alkyl glycidyl ethers containing the requisite C4 to C22 alkyl substituents may be utilized for the preparation of the capped-polyamine foam control agents of this invention. Alkyl groups which are suitable should have sufficient carbon to confer surface activity, i.e., an ability to act as a foam control agent and reduce the surface tension of water.

The alkyl groups in the alkyl glycidyl ether-capped polyamines of this invention may be the same or different. Alkyl groups may be linear or branched. Examples of suitable alkyl glycidyl ethers include butyl glycidyl ether, iso-butyl glycidyl ether, pentyl glycidyl ether, iso-amyl glycidyl ether, hexyl glycidyl ether, 2-ethylhexyl glycidyl ether, octyl glycidyl ether, decyl glycidyl ether, lauryl glycidyl ether, myristyl glycidyl ether, cetyl glycidyl ether and so on.

Examples of polyamines include diethylenetriamine (DETA), triethylenetetramine (TETA), tetraethylenepentamine (TEPA) and di(aminopropyl)amine (DAPA). Optimal performance for a specific application can be achieved by appropriate manipulation of the starting amine and alkyl glycidyl ether and the degree of adduction.

An amount of alkyl glycidyl ether-capped polyamine that is effective to reduce or eliminate the foam of a water-based, organic compound-containing composition may range from 0.001 to 20 g/100 mL, preferably 0.01 to 10 g/100 mL, of the aqueous composition. Naturally, the most effective amount will depend on the application and the efficiency of the particular foam control agent.

The alkyl glycidyl ether-capped polyamines are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a detergent, a caustic cleaning agent, a herbicide, a fungicide, an insecticide, or a plant growth modifying agent.

In the following water-based protective or decorative organic coating, ink, adhesive, fountain solution, agricultural and varnish compositions containing an alkyl glycidyl ether-capped polyamine according to the invention, the other listed components of such compositions are those materials well known to the workers in the relevant art.

A typical water-based coating formulation to which the foam control agents of the invention may be added would comprise the following components in an aqueous medium at 30 to 80% "solids", i.e., listed ingredients:

| Typical Water-Based Coating Formulation | |
| --- | --- |
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids |
| 0 to 20 wt % | Coalescing or Other Solvents |
| 0.01 to 10 wt % | Surfactant/Wetting Agent/Flow and Leveling Agents |
| 0.01 to 5 wt % | Alkyl Glycidyl Ether-Capped Foam Control Agent |

A typical water-based ink composition to which the foam control agent of the invention may be added would comprise the following components in an aqueous medium at 20 to 60% "solids", i.e., listed ingredients:

| Typical Water-Based Ink Composition | |
| --- | --- |
| 1–50 wt % | Pigment |
| 0 to 50 wt % | Pigment Dispersant/Grind Resin |
| 0 to 50 wt % | Clay base in appropriate resin solution vehicle |
| 5 to 99.9 wt % | Waterborne/Water-Dispersible/Water-Soluble Resins |
| 0 to 30 wt % | Coalescing Solvents |
| 0.01 to 10 wt % | Surfactant/Wetting Agent |
| 0.01 to 10 wt % | Processing Aids/Solubilizing Agents |
| 0.01 to 5 wt % | Alkyl Glycidyl Ether-Capped Foam Control Agent |

A typical water-based agricultural composition to which the foam control agent of the invention may be added would comprise the following components in an aqueous medium at 0.1 to 80% ingredients:

| Typical Water-Based Agricultural Composition | |
| --- | --- |
| 0.1–50 wt % | Herbicide, Insecticide or Plant Growth Modifying Agent |
| 0 to 5 wt % | Dyes |
| 0 to 20 wt % | Thickeners/Stabilizers/Co-surfactants/Gel Inhibitors |
| 0 to 25 wt % | Antifreeze |
| 0.01 to 50 wt % | Surfactants/Wetting Agent |
| 0.01 to 10 wt % | Alkyl Glycidyl Ether-Capped Foam Control Agent |

A typical fountain solution composition for planographic printing to which the foam control agent of the invention may be added would comprise the following components:

| Typical Fountain Solution for Planographic Printing | |
| --- | --- |
| 0.05 to 10 wt % | Film Formable, Water Soluble Macromolecule |
| 1 to 25 wt % | Alcohol, Glycol, or Polyol With 2–12 Carbon Atoms |
| 0.01 to 20 wt % | Water Soluble Organic Acid, Inorganic Acid, or a Salt thereof |
| 30 to 70 wt % | Water |
| 0.01 to 5 wt % | Wetting Agent |
| 0.01 to 5 wt % | Alkyl Glycidyl Ether-Capped Foam Control Agent |

A typical pressure sensitive adhesive to which the foam control agent of the invention may be added would comprise the following components:

| Typical Pressure Sensitive Adhesive | |
|---|---|
| 50 to 99 wt % | Waterborne Acrylic Copolymer Emulsion or SBR/Natural Rubber Latex |
| 0 to 50 wt % | Tackifier Dispersion |
| 0 to 5 wt % | Rheology Modifier |
| 0 to 10 wt % | Water |
| 0.1 to 5 wt % | Wetting Agent |
| 0.1 to 5 wt % | Alkyl Glycidyl Ether-Capped Foam Control Agent |

A typical overprint varnish to which the foam control agent of the invention may be added would comprise the following components:

| Typical Overprint Varnish | |
|---|---|
| 20 to 80 wt % | Waterborne/Water Dispersible Resin |
| 0 to 20 wt % | Wax |
| 2 to 50 wt % | Water |
| 0 to 20 wt % | Biocides/Optical Brighteners/Crosslinkers/Scuff and Water Resistant Additives |
| 0 to 20 wt % | Co-Solvents |
| 0.01 to 5 wt % | Wetting Agent |
| 0.1 to 5 wt % | Alkyl Glycidyl Ether-Capped Foam Control Agent |

Examples 1–26 illustrate the synthesis of various foam control agents. All materials were synthesized and characterized via either GC, MALDI or Nuclear Magnetic Resonance (NMR) spectroscopy. Diethylenetriamine (DETA) and di(aminopropyl)amine (DAPA) were purchased as 99% pure from Aldrich Chemical Co. and used as received. The tetraethylenetriamine (TETA) used is sold by Air Products and Chemicals, Inc. as Ancamine® TETA curing agent which comprises about 67% TETA and also contains tris(2-aminoethyl)amine and piperazine derivatives. The alkylglycidyl ether reagents used are sold by Air Products and Chemicals, Inc. under the trademarks Epodil® 741 HP, Epodil® 746 and Epodil® 748 and contain 98+% n-butyl glycidyl ether, 70–73% 2-ethylhexylglycidyl ether and 75–81% of a $C_{12}$–$C_{16}$ mixed-stream glycidyl ether, respectively. The Epodil® 748 material is predominately lauryl glycidyl ether. For the purposes of this invention these reagents will be referred to as n-butyl glycidyl ether (BGE), 2-ethylhexylglycidylether (EHGE) and $C_{12}$–$C_{16}$ alkyl glycidyl ether (CGE).

EXAMPLES 1–4

The 1:1, 1:2, 1:3 and 1:4 adducts of diethylenetriamine (DETA) and n-butyl glycidyl ether (BGE) were prepared by the reaction of neat DETA with the appropriate number of equivalents of BGE. To a 3-necked round-bottomed flask equipped with an addition funnel, a reflux condenser, a thermocouple and a magnetic stir bar were added DETA (40.00 g). The amine was heated to 100° C. under nitrogen. At this point, the heat was turned off and the BGE was added to the amine at a rate which allowed for the reaction temperature to be maintained between 90–120° C. After the addition of one equivalent of BGE (50.92 g) the reaction was heated at 100° C. for 40 min and then a sample was removed (Example 1, 15.01 g, 1:1 DETA/BGE adduct, light yellow oil). To the reaction mixture were subsequently added 2–4 equivalents of BGE at 85–120° C. After the addition of each equivalent, the reaction was heated to 100° C. for at least 20 min. The following samples were sequentially removed from the reaction pot; Example 2 (20.00 g, 1:2 DETA/BGE, light yellow oil), Example 3 (20.00 g, 1:3 DETA/BGE, light yellow oil) and Example 4 (20.00 g, 1:4 DETA/BGE, light yellow oil). These samples were used without further purification.

EXAMPLE 5

The 1:5 adduct of diethylenetriamine (DETA) and n-butyl glycidyl ether (BGE) was prepared by the reaction of neat amine with the 5 of equivalents of BGE. To a 3-necked round-bottomed flask equipped with an addition funnel, a reflux condenser, a thermocouple and a magnetic stir bar were added DETA (53.89 g). The DETA was heated to 80° C. under nitrogen. At this point, the heat was turned off and the BGE was added to the DETA at a rate which allowed for the reaction temperature to be maintained between 80–115° C. After the addition of the BGE (342.53 g) the reaction was heated at 100–102° C. for 40 min to yield a light yellow oil (394.1 g, 1:5 DETA/BGE adduct). This sample was used without further purification.

EXAMPLES 6–10

The 1:1, 1:2, 1:3, 1:4 and 1:5 adducts of diethylenetriamine (DETA) and 2-ethylhexyl glycidyl ether (EHGE) were prepared by the reaction of neat DETA with the appropriate number of equivalents of EHGE using a procedure similar to that in Examples 1–5. The adducts formed were Example 6 (100 g, 1:1 DETA/EHGE, thick yellow slurry), Example 7 (100 g, 1:2 DETA/EHGE, very light yellow oil), Example 8 (100 g, 1:3 DETA/EHGE, very light yellow oil), Example 9 (100 g, 1:4 DETA/EHGE, very light yellow oil) and Example 10 (100 g, 1:5 DETA/EHGE, very light yellow oil). These materials were used without further purification.

EXAMPLES 11–15

The 1:1, 1:2, 1:3, 1:4 and 1:5 adducts of diethylenetriamine (DETA) and C12–16 alkyl glycidyl ether (CGE) were prepared by the reaction of neat DETA with the appropriate number of equivalents of CGE using a procedure similar to that in Examples 1–5. The adducts formed were Example 11 (150 g, 1:1 DETA/CGE, viscous yellow slurry), Example 12 (125 g, 1:2 DETA/CGE, viscous yellow slurry), Example 13 (100 g, 1:3 DETA/CGE, yellow oil), Example 14 (125 g, 1:4 DETA/CGE, yellow oil) and Example 15 (304 g, 1:5 DETA/CGE, golden oil). These materials were used without further purification.

EXAMPLES 16–21

The 1:1, 1:2, 1:3, 1:4, 1:5 and 1:6 adducts of triethylenetetramine (TETA) and n-butyl glycidyl ether (BGE) were prepared by the reaction of neat TETA with the appropriate number of equivalents of BGE using a procedure similar to that in Examples 1–5. The adducts formed were Example 16 (100 g, 1:1 TETA/BGE, light yellow oil), Example 17 (100 g, 1:2 TETA/BGE, viscous light yellow oil), Example 18 (96 g, 1:3 TETA/BGE, viscous light yellow oil), Example 19 (99 g, 1:4 TETA/BGE, viscous light yellow oil), Example 20 (101 g, 1:5 TETA/BGE, viscous light yellow oil) and Example 21 (215 g, 1:6 TETA/BGE, viscous light yellow oil). The resulting adducts were used without further purification.

EXAMPLES 22–26

The 1:1, 1:2, 1:3, 1:4 and 1:5 adducts of di(aminopropyl) amine (DAPA) and n-butyl glycidyl ether (BGE) were prepared by the reaction of neat DAPA with the appropriate number of equivalents of BGE using a procedure similar to that in Examples 1–5. The adducts formed were Example 22 (100 g, 1:1 DAPA/BGE, dark golden liquid), Example 23 (100 g, 1:2 DAPA/BGE, dark golden liquid), Example 24 (100 g, 1:3 DAPA/BGE, golden liquid), Example 25 (100 g, 1:4 DAPA/BGE, golden liquid) and Example 26 (172 g, 1:5 DAPA/BGE, yellow liquid). The resulting adducts were used without further purification.

EXAMPLES 27–53

Dioctyl sodium sulfosuccinate (DOSS) is a commonly used surfactant in waterborne compositions. DOSS is capable of forming stable foams when dissolved in water. The foam control characteristics of various foam control agents may be assessed by measuring the foam generated by a 0.1 wt % aqueous solution of DOSS and comparing this to the foam generated after the addition of foam control agent to a 0.1 wt % DOSS solution. The DOSS utilized in these measurements was Aerosol OT 75% surfactant obtained from Cytec Industries. The foaming and foam stability of DOSS were measured using ASTM D 1173—53 at ambient temperature, typically 23° C. The foam control properties of the foam control agents prepared in Examples 1–26 were measured by adding 0.1 wt % foam control agent to 0.1 wt % DOSS in water, separating the resulting solution from any insoluble oil and using the aforementioned procedure to assess the reduction in foamability and foam stability.

In these tests, an aqueous solution of DOSS or the filtrate from the DOSS/foam control agent mixture was added from an elevated foam pipette to a foam receiver containing the same solution. The foam height was measured at the completion of the addition ("Initial Foam Height") and the time required for the foam to dissipate at the air-liquid interface ("Time to 0 Foam") was recorded. This test provided a comparison between the foaming characteristics of various aqueous compositions. The results for the foam control agents prepared in Examples 1–26 are reported in Table 1 along with comparative data for a 0.1 wt % solution of DOSS with no added foam control agent (Example 27).

TABLE 1

| | Foam control Agent | Initial foam height (cm) | Foam height after 5 min (cm) | Time to zero foam |
|---|---|---|---|---|
| Ex 27 | DOSS only | 3.0 | 2.7 | >10 min |
| Ex 28 | DETA/1 BGE | 1.0 | 0.1 | 5.9 min |
| Ex 29 | DETA/2 BGE | 1.0 | 0 | 2.7 min |
| Ex 30 | DETA/3 BGE | 0.7 | 0 | 3.3 min |
| Ex 31 | DETA/4 BGE | 0.5 | 0 | 2.9 min |
| Ex 32 | DETA/5 BGE | 1.0 | 0.8 | >10 min |
| Ex 33 | DETA/1 EHGE | 0.4 | 0 | 29 sec |
| Ex 34 | DETA/2 EHGE | 0.5 | 0 | 20 sec |
| Ex 35 | DETA/3 EHGE | 0.9 | 0 | 2.5 min |
| Ex 36 | DETA/4 EHGE | 1.4 | 0.9 | >10 min |
| Ex 37 | DETA/5 EHGE | 3.2 | 2.3 | >10 min |
| Ex 38 | DETA/1 CGE | 0.9 | 0 | 4.5 min |
| Ex 39 | DETA/2 CGE | 0.7 | 0 | 1.2 min |
| Ex 40 | DETA/3 CGE | 2.8 | 2.4 | >10 min |
| Ex 41 | DETA/4 CGE | 6.0 | 5.3 | >10 min |
| Ex 42 | DETA/5 CGE | 5.8 | 4.8 | >10 min |
| Ex 43 | TETA/1 BGE | 1.7 | 0.4 | >10 min |
| Ex 44 | TETA/2 BGE | 1.3 | 0 | 50 sec |
| Ex 45 | TETA/3 BGE | 1.4 | 0 | 1.3 min |
| Ex 46 | TETA/4 BGE | 1.4 | 0 | 2.8 min |
| Ex 47 | TETA/5 BGE | 1.5 | 0.4 | 6.2 min |
| Ex 48 | TETA/6 BGE | 1.3 | 0.6 | 9.4 min |
| Ex 49 | DAPA/1 BGE | 2.0 | 0 | 4.6 min |
| Ex 50 | DAPA/2 BGE | 1.7 | 0 | 2.7 min |
| Ex 51 | DAPA/3 BGE | 1.0 | 0 | 1.3 min |
| Ex 52 | DAPA/4 BGE | 1.0 | 0 | 1.2 min |
| Ex 53 | DAPA/5 BGE | 2.0 | 0.7 | >10 min |

The data in Table 1 show that many alkyl glycidyl ether-capped polyamines behave as foam control agents when added to an aqueous solution of a foamy surfactant, such as DOSS. The foam control behavior, however, is highly dependent on the combination of alkyl glycidyl ether and polyamine. As can be seen, certain combinations, such as DETA with 4 or 5 equivalents of the $C_{12-16}$ alkyl glycidyl ether, actually increase foaming when added to the 0.1 wt % aqueous DOSS solution. Therefore, it was unexpected that certain adducts of alkyl glycidyl ethers and polyamines would yield materials which were particularly effective foam control agents. In the defoaming test described herein, those materials which exhibited an ability to reduce the initial foam height of DOSS by at least 30%, preferably 50% or greater, or those which were able to completely dissipate foam by 5 minutes were the best performing foam control agents. However, the efficiency of a particular foam control agent is generally system-specific. Therefore, the optimum choice of a foam control agent for a specific application will depend on the choice of polyamine and alkyl glycidyl ether and the degree of polyamine adduction.

EXAMPLES 54–79

The foam control agents of this invention are also capable acting as wetting agents in waterborne systems. The wetting ability of the foam control agents prepared in Examples 1–26 was determined by assessing their ability to reduce the dynamic surface tension of water. The materials in Examples 1–26 were added to distilled water at 0.1–5.0 wt % to give completely soluble aqueous solutions or saturated aqueous mixtures. Dynamic surface tension data were obtained for the soluble portion of these samples using the maximum bubble pressure method at bubble rates from 0.1 bubbles/sec (b/s) to 20 b/s. These data provide information about the performance of the foam control agents as wetting agents from slow surface creation rates (0.1 b/s) through extremely high surface creation rates (20 b/s). In practical terms, high bubble rates correspond to high printing speeds in lithographic printing, high spray or roller velocities in coating applications, and rapid application rates for agricultural products.

The relative efficiency of surface tension reduction can be obtained by comparing surface tension reduction of solutions containing the same amount of different surfactants. Such data is given for 0.1 wt % solutions of the foam control agents at 0.1, 1, 6 and 20 bubbles/second (b/s). The limiting surface tensions at 0.1, 1, 6 and 20 b/s represent the lowest surface tensions in water which can be achieved at the given surface creation rates for a given surfactant regardless of the amount of surfactant used and is used to evaluate the effectiveness of a surfactant. In most cases the limiting surface tension was taken at 1.0 wt % since the foam control agent was insoluble at this concentration. In the case where the foam control agent was soluble at 1.0 wt %, the limiting surface tension was taken at 5.0 wt % (where the samples were insoluble). These values give information about the relative ability to a surfactant to reduce surface defects under near-equilibrium conditions (0.1 b/s) through very dynamic conditions (20 b/s). Lower surface tensions would allow the elimination of defects upon application of a formulation onto lower energy surfaces. Table 2 shows the dynamic surface tension data of aqueous solutions of the foam control agents.

TABLE 2

| | | γ at 0.1 wt % | | | | γ limiting[a] | | | |
|---|---|---|---|---|---|---|---|---|---|
| | | 0.1 b/s | 1 b/s | 6 b/s | 20 b/s | 0.1 b/s | 1 b/s | 6 b/s | 20 b/s |
| Ex 54 | DETA/1 BGE | 49.3 | 53.6 | 58.2 | 64.0 | 35.1 | 37.4 | 40.2 | 44.0 |
| Ex 55 | DETA/2 BGE | 39.3 | 42.1 | 46.7 | 54.0 | 32.9 | 33.2 | 34.0 | 36.1 |
| Ex 56 | DETA/3 BGE | 35.4 | 37.2 | 40.7 | 48.1 | 32.7 | 33.1 | 34.1 | 36.0 |
| Ex 57 | DETA/4 BGE | 35.3 | 36.9 | 40.2 | 49.4 | 33.3 | 33.8 | 35.0 | 37.6 |
| Ex 58 | DETA/5 BGE | 36.2 | 40.6 | 53.2 | 67.2 | 35.1 | 36.7 | 41.0 | 49.9 |
| Ex 59 | DETA/1 EHGE | 27.9 | 40.7 | 53.4 | 62.6 | 26.9 | 27.9 | 30.4 | 33.2 |
| Ex 60 | DETA/2 EHGE | 30.9 | 53.4 | 62.9 | 70.4 | 28.4 | 28.9 | 32.6 | 36.1 |
| Ex 61 | DETA/3 EHGE | 48.2 | 66.0 | 69.9 | 71.8 | 32.0 | 37.4 | 49.4 | 56.9 |
| Ex 62 | DETA/4 EHGE | 64.8 | 69.7 | 70.7 | 72.1 | 41.0 | 50.9 | 60.0 | 58.3 |
| Ex 63 | DETA/5 EHGE | 67.1 | 69.3 | 70.7 | 72.1 | 37.5 | 30.4 | 32.4 | 34.7 |
| Ex 64 | DETA/1 CGE | 42.6 | 56.7 | 68.8 | 72.4 | 33.8 | 44.2 | 55.3 | 68.2 |
| Ex 65 | DETA/2 CGE | 62.7 | 68.6 | 69.7 | 70.0 | 45.0 | 51.9 | 59.7 | 62.3 |
| Ex 66 | DETA/3 CGE | 70.9 | 71.4 | 71.8 | 71.1 | 57.9 | 68.7 | 70.5 | 69.3 |
| Ex 67 | DETA/4 CGE | 71.2 | 71.6 | 71.8 | 70.8 | 53.6 | 71.0 | 71.4 | 67.8 |
| Ex 68 | DETA/5 CGE | 71.7 | 72.4 | 72.5 | 71.8 | 39.6 | 56.5 | 70.9 | 66.5 |
| Ex 69 | TETA/1 BGE | 51.7 | 55.8 | 59.8 | 64.1 | 33.4[b] | 34.8[b] | 35.9[b] | 37.4 |
| Ex 70 | TETA/2 BGE | 42.6 | 45.6 | 49.3 | 54.6 | 34.1 | 34.7 | 36.1 | 37.2 |
| Ex 71 | TETA/3 BGE | 37.6 | 39.8 | 42.9 | 47.4 | 33.3 | 33.5 | 34.5 | 34.9 |
| Ex 72 | TETA/4 BGE | 35.8 | 37.1 | 40.8 | 46.9 | 33.9 | 34.3 | 35.5 | 36.6 |
| Ex 73 | TETA/5 BGE | 36.2 | 39.3 | 44.8 | 55.1 | 35.1 | 35.5 | 38.2 | 41.2 |
| Ex 74 | TETA/6 BGE | 38.3 | 43.5 | 51.8 | 64.7 | 35.0 | 37.0 | 40.1 | 44.5 |
| Ex 75 | DAPA/1 BGE | 50.4 | 54.6 | 57.3 | 44.6 | 33.7[b] | 34.3[b] | 34.8[b] | 35.1[b] |
| Ex 76 | DAPA/2 BGE | 41.4 | 44.9 | 47.7 | 38.7 | 34.4 | 35.4 | 36.5 | 52.7 |
| Ex 77 | DAPA/3 BGE | 36.5 | 38.4 | 41.8 | 37.9 | 33.7 | 34.2 | 35.4 | 47.9 |
| Ex 78 | DAPA/4 BGE | 36.5 | 38.2 | 42.4 | 40.2 | 34.4 | 35.4 | 36.9 | 51.7 |
| Ex 79 | DAPA/5 BGE | 37.7 | 44.1 | 57.4 | 53.5 | 35.5 | 37.9 | 43.1 | 70.7 |

[a] γ limiting is reported as the surface tension of a saturated solution made using 1.0 wt % defoamer in water unless otherwise noted.
[b] γ limiting is reported as the surface tension of a saturated solution made using 5.0 wt % defoamer since 1.0 wt % of this defoamer was completely soluble in water.

The data in Examples 54–79 in Table 2 illustrate that various foam control agents have the ability to reduce the surface tension of an aqueous composition and that in many cases low surface tension can be maintained even under conditions in which surface is created at a rapid rate. In particular, those surfactants which are capable of reducing the dynamic surface tension of water to 45 dyne/cm or less at 25° C. at 0.1 b/s are preferred for use in applications in which wetting is important and those which yield dynamic surface tension values of less than 45 dyne/cm at 0.1 wt % and 0.1 b/s are most preferred.

Thus, the foam control agents of this invention may be utilized as multi-functional additives. Such a combination of attributes allow for these materials to be used to control and eliminate foam with significantly less deleterious effects in application, making them extremely useful in coatings, inks and adhesives. Moreover, the wetting ability of these foam control agents will allow these materials to be utilized in polymer production and processing without the appearance of negative effects in downstream applications. In addition, these foam control agents may allow for the reduction in the total amount of additives used in application or as a process aids since they may replace wetting agents.

We claim:

1. In a method for controlling the foaming of a waterborne composition or an industrial process by the incorporation of a foam controlling agent, the improvement which comprises adding as the foam controlling agent a compound of the formula:

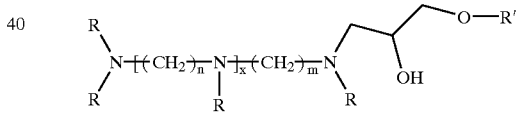

where
n and m are 2 or 3,
x is 1 or 2,

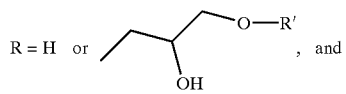

and
R' is a C4 to C22 alkyl group,
the compound, when added at 0.1 wt % to a 0.1 wt % aqueous solution of dioctyl sodium sulfosuccinate (DOSS). generating an initial foam height of such aqueous solution that is at least 30% less than the initial foam height of the aqueous DOSS solution without such compound, the compound added to the waterborne composition or industrial process at 0.01 to 10 g/100 mL.

2. The method of claim 1 in which R' is C4–C14 alkyl.

3. The method of claim 1 in which n and m are 2.

4. The method of claim 1 in which the compound, when added to the 0.1 wt % aqueous DOSS solution, generates an initial foam height at least 50% less than the initial foam height of the aqueous DOSS solution without such compound.

5. The method of claim 1 in which R' is C4 alkyl, x is 1, n and m are 2 and the degree of adduction is 2, 3 or 4.

6. The method of claim 1 in which R' is C4 alkyl, x is 2, n and m are 2 and the degree of adduction is 2, 3 or 4.

7. The method of claim 1 in which R' is C8 alkyl, x is 1, n and m are 2 and the degree of adduction is 1, 2 or 3.

8. The method of claim 1 in which R' is C12–16 alkyl x is 1, n and m are 2 and the degree of adduction is 1 or 2.

9. The method of claim 1 in which R' is C4 or C8 alkyl, x is 1, and n and m are both 2.

10. The method of claim 1 in which the waterborne composition is a protective or decorative coating, an ink composition, an adhesive composition or an agricultural composition.

11. The method of claim 1 in which the industrial process is oil well pumping, petroleum gas scrubbing, cleansing or disinfecting, food processing, pulp or paper processing, fermentation, metal treatment, polymer or chemical synthesis, waste-water treatment, or textile dyeing or finishing.

* * * * *